G. R. METCALF.
APPARATUS FOR SOLDERING.
APPLICATION FILED JULY 29, 1918.

1,320,632.

Patented Nov. 4, 1919.
2 SHEETS—SHEET 1.

Witnesses
Milton Lenoir

Inventor
George R. Metcalf
Clarence W. Taylor
Attorney.

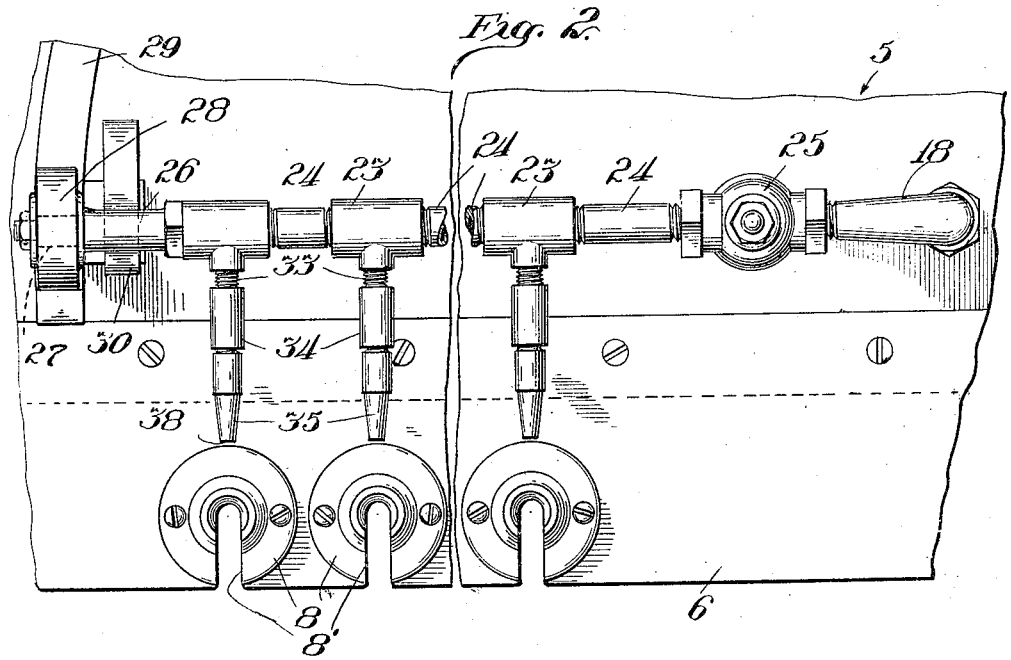
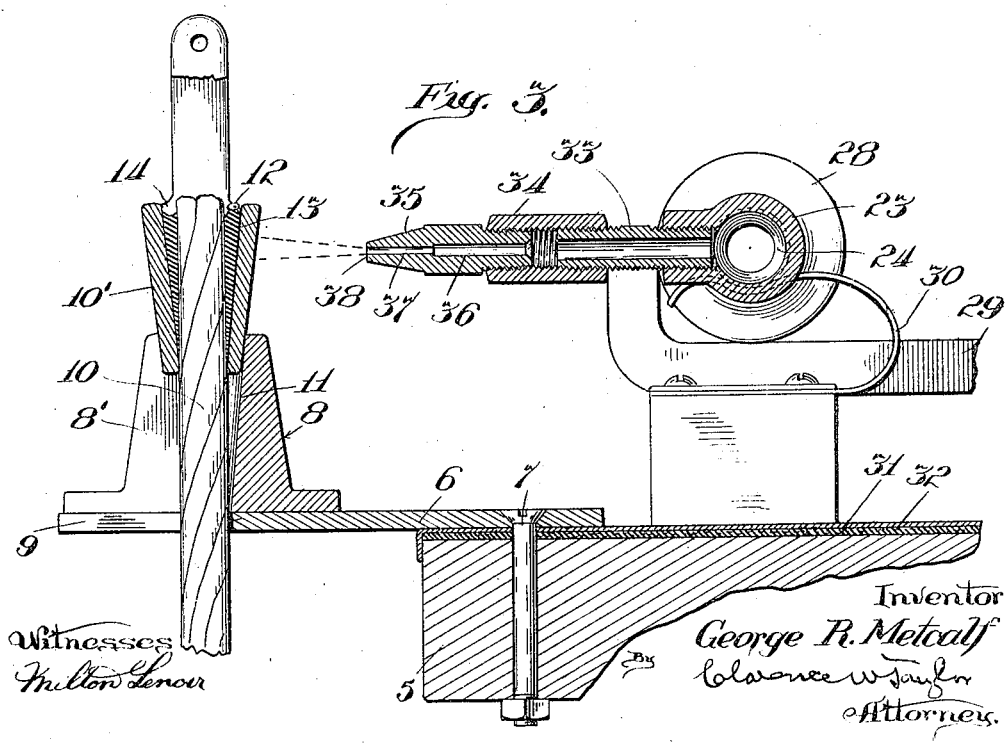

UNITED STATES PATENT OFFICE.

GEORGE R. METCALF, OF OAK PARK, ILLINOIS.

APPARATUS FOR SOLDERING.

1,320,632. Specification of Letters Patent. Patented Nov. 4, 1919.

Application filed July 29, 1918. Serial No. 247,174.

*To all whom it may concern:*

Be it known that I, GEORGE R. METCALF, a citizen of the United States, residing at Oak Park, in the county of Cook and State of Illinois, have invented certain new and useful Improvements in Apparatus for Soldering, of which the following is a specification.

My invention relates to apparatus for soldering and the principal objects of my improvement are:

First, the provision of apparatus constructed largely of gas fittings, simple and practical in operation, and capable of indefinite duplication of working sections and the consequent turning out of large quantities of work in a given time without the employment of skilled labor;

Second, the production of devices of the class described whereby maximum heat and improved results with minimum consumption of fluid fuel may be obtained.

With the above and other objects in view, my invention consists in the novel features and in the novel combination and arrangement of parts illustrated in the accompanying drawings forming a part of this specification, and particularly pointed out in the claim hereunto appended, it being understood that changes, variations and modifications in the details of said apparatus within the scope of the claim may be resorted to without departing from the spirit or sacrificing any of the advantages thereof.

In the drawings:

Fig. 2 is a top plan of portions of a section of burners disposed upon the front portion of the top of a bench.

Fig. 3 is a cross sectional view through a burner, a work holder and parts to be soldered together, the cable being shown in elevation.

Similar numerals refer to like parts throughout the several views.

Figure 1:
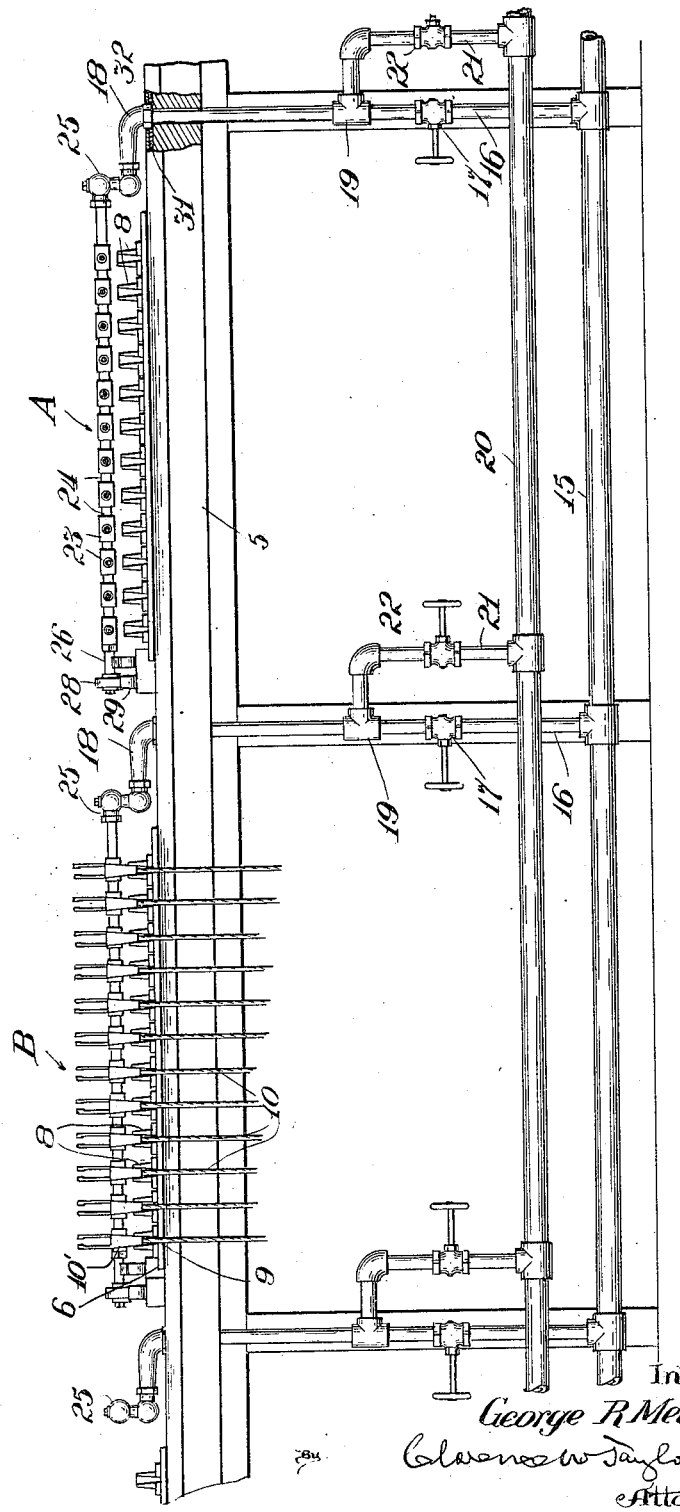
Figure 1 is a side elevation of the pipe arrangement for supplying fluid fuel to burners which are supported above a suitable work-bench.

In accordance with my invention, the embodiment chosen for exemplification consists in a supporting bench 5, preferably having a plate of steel 6 of suitable width secured to the front edge of the bench 5 at 7 and extending forwardly a few inches for bolting of the work-holders 8 thereto which are slotted to 8'. The plate is slotted at 9 to receive the portion 10 of the particular kind of work shown in the illustration in the drawings herein. My invention is not limited to soldering operations in which the work-holder is formed with a conical socket 11 in holder 8 for receiving and holding the solder 12 and parts 10 and 10' to be united by solder. Changes and variations in the details of construction of work-holders to meet the requirements for support of work varying in dimensions will necessitate modification in the details in construction of such work-holders, which will readily occur to those skilled in this art. The bore 13 in the part 10' is conical and the part 10 is of the same cross section throughout. When sufficient heat is applied the pellets of solder 12 will melt and fill the space 14 between said parts 10 and 10'.

In the work shown, the wire cable 10, to which it is desired to solder the socket member 10', is formed of smaller cables of wire and melted solder has a tendency to run downwardly between the smaller cables or strands and the socket 10' and escape before it sets or hardens, therefore in practice it is desirable to employ a plastic substance to dam the lower ends of the spaces between the smaller cables which is accomplished by using asbestos mixed with water and a little salt mixed to the consistency of a thick paste which may be applied below the part 10' to prevent the melted solder dropping out before hardening.

There is provided a main gas supply pipe 15 leading to a source of gas (not shown) and branch gas delivery pipes 16 each connected at one end with a series of burners disposed above the steel plate 6 and at the other end in operative connection with the gas supply pipe 15. The flow of gas through pipe 16 is controlled by globe valve 17. Intermediate the valve 17 and the street elbow 18 on the delivery end of pipe 16 is a T 19 hereinafter referred to. There is provided also a main air supply pipe 20 leading to a blower (not shown) or other source of atmospheric air under pressure and branch air delivery pipes 21, each having a globe valve 22 and the delivery end operatively connected with T 19 for the introduction of air under pressure into the branch gas pipe 16 and the consequent proportioning of the gas and the air before its delivery to the burner or burners.

The piping, including T's, valves, elbows and connections are of usual construction and therefore not further described.

For the purpose among other things of soldering quite a number of articles or things at a time I have procured apparatus of large capacity by providing one or more sections composed of a series of burners by using T's 23, nipples 24, beginning with a swivel joint 25, which is in threaded connection with the street elbow 18 of each section, first using a nipple 24 in the delivery end of the swivel joint 25, then a T 23 and alternating nipple and T, three inch centers, until the desired number of burners is provided, herein shown twelve burners, the nipple 26 at the free end of the section or bank of burners has threaded engagement with a stub shaft 27 which carries a wheel 28 adapted to travel on track 29 on top of the bench 5.

To prevent the burner section moving too far or not far enough I put a small spring bracket 30 in the upper surface of the bench.

Preferably the top of the bench is covered with sheet asbestos 31 and then lined or covered with sheet metal 32.

In the construction and installation of the burner sections I employ in the half inch ends of the half inch T's 23, reducer bushings 33, one half to one half, and connected in these bushings one eighth inch pipes, and on the ends of the eighth inch pipes there is connected one eighth inch couplings 34. A burner tip 35, made of brass rod threaded on one end to fit the eighth inch couplings 34 has an axial bore 36, one eighth inch half way from the threaded end and a bore 37 one sixteenth inch the rest of the way. From one half the length of the outside diameter this burner 35 is tapered down to a feather edge at its free end 38.

The work holder 8 is suitably fixed to the metal plate 6, and the burner sections A. B. respectively, are mounted to swing through an arc of a circle so as to be pushed out of the operator's way when not in use, the sections being parallel with the top of the bench 5. The stop bracket 30 serves to stop and hold the burner section a predetermined distance between the free ends 38 of the burner jets 35 and the part 10' of the work positioned in the holder 8.

The burners 35 are separate and spaced apart.

By the construction herein it is important to dilute the gas with air under independent pressure and that the proper mixture be obtained before reaching the burner jets where combustion takes place in the open air.

By the construction hereinbefore shown and described the operator is able to get a mixture of gas and air in any proportion desired up to the full capacity of the supply pipes. Any number of burner sections may be installed by properly dimensioning the supply and other piping.

In operation the gas is first turned on to full opening and the burners of one section are then lighted, then the air under independent pressure is turned on until a proper mixture for the desired flame is obtained, when soldering operation may begin. It will be noted the burners are positioned with reference to the work so that the flame is projected against at least one of the parts to be united together by solder.

It will be noticed I have connected the gas by a straight run to the burners with the air shooting into the T 19 at right angle to the path of travel of the gas. This construction affords a prompt and intimate mixture of the gas and air and by manipulating the air valve 22, the character of the flame particularly with reference to the degree of heat produced by the flame, is regulated.

By thus showing and describing one embodiment of my invention I do not intend to restrict the range of equivalents not made necessary by the prior state of the art.

Having thus fully described my invention, what I claim as new and desire to secure by Letters-Patent is:

In soldering apparatus, the combination of supporting means, a burner section mounted to swing through an arc of a circle, a plurality of burners carried by the burner section, each burner having a burner tip, a source of gas under pressure, a source of air under independent pressure, pipes and connections for conducting and mixing said gas and air before the mixture passes to the burner section, a plurality of alined work holders fixed to the top of the supporting means, a stop bracket to limit movement in one direction and hold the burner section in alinement with the work holders and valve means to control the proportions of gas and air in said mixture.

In testimony whereof I affix my signature.

GEORGE R. METCALF.